COLOR TELEVISION SYSTEMS WITH CODING

Filed May 3, 1957 5 Sheets-Sheet 1

INVENTOR
GEORGES VALENSI
BY Kurt Kelman

Jan. 5, 1960 G. VALENSI 2,920,131

COLOR TELEVISION SYSTEMS WITH CODING

Filed May 3, 1957 5 Sheets-Sheet 2

INVENTOR
GEORGES VALENSI
BY Kurt Kelman
AGENT

Jan. 5, 1960 G. VALENSI 2,920,131

COLOR TELEVISION SYSTEMS WITH CODING

Filed May 3, 1957 5 Sheets-Sheet 3

INVENTOR
GEORGES VALENSI
BY Kurt Kelman
AGENT

COLOR TELEVISION SYSTEMS WITH CODING

Filed May 3, 1957 5 Sheets-Sheet 4

INVENTOR
GEORGES VALENSI
BY Kurt Kelman
AGENT

Jan. 5, 1960 G. VALENSI 2,920,131

COLOR TELEVISION SYSTEMS WITH CODING

Filed May 3, 1957 5 Sheets-Sheet 5

INVENTOR
GEORGES VALENSI
BY Kurt Kelman
AGENT

United States Patent Office 2,920,131

Patented Jan. 5, 1960

2,920,131

COLOR TELEVISION SYSTEMS WITH CODING

Georges Valensi, Geneva, Switzerland

Application May 3, 1957, Serial No. 656,970

Claims priority, application France February 13, 1957

4 Claims. (Cl. 178—5.2)

Figure 12 of U.S. Patent No. 2,375,966, entitled "Systems of Television in Colors," represents Maxwell's color triangle divided in sectors by means of lines joining the center to various points of the spectrum locus, and by means of equal saturation contours. Figure 6 of U.S. Patent No. 2,492,926, entitled "Color Television Systems," represents the color television transmitter in which the cathode ray beam of the encoding tube O, under the action of magnetic deflection coils *bx*, be energized by electric voltages proportional to the trichromatic coordinates *x, y* of the color of the elemental area being scanned, illuminates, at each instant, the desired sector of the color triangle on the encoding screen *e* having a graded transparency and behind which a photoelectric cell *ph* generates the coded color signal T corresponding to the color of said scanned elemental area. Figure 7 of said U.S. Patent No. 2,492,926 represents the color television receiver embodying a "cathodic commutator" C, acting as decoding tube, in which the vertical electronic image of a rectilinear cathode, under the action of magnetic deflection coil B energized by an electric voltage proportional to said coded color signal T, is positioned, at each instant, on a vertical line of a mask provided with appropriate horizontal slits, in such a way that the groups of electrons (going through said slits) produce, on the final anodes ($a_n$, $a_b$, $a_j$, $a_r$) electric voltages which permit the reproduction, on the projection screen EP, of the color (hue and saturation) as well as the brightness of the elemental area scanned at said instant.

A first object of the present invention is an improvement in the above mentioned encoding and decoding devices, particularly in view of avoiding the color errors, which could occur if the cathode ray beam (in the encoding tube of the transmitting station) impinges exactly for example on the boundary of the external sectors of the color triangle, or on the line between two sectors of very different numbers; in such a case the coded color signal T would not be proportional to the number of the sector corresponding to the color of the scanned elemental area of the televised object, but would be the arithmetic mean of two very different numbers.

Another object of the present invention is an arrangement for the transmission, through a waves-guide (connecting together the color television transmitter and receiver), with the minimum number of coded pulses, simultaneously at each instant the "luminance signal" and the "coded color signal" corresponding to the elemental area of the televised object scanned at said instant.

Other advantageous features of the present invention will appear in the following description.

Figure 1 represents Maxwell's color triangle in orthogonal coordinates *x, y,* in conformity with the XYZ reference system of the International Illumination Committee.

Figure 1–*a* represents a logarithmic transform of the color triangle of Figure 1.

Figure 2–*a* represents the oscillogram of one scanning line.

Figure 3–*a* represents one component of said decoding device.

Figure 2:
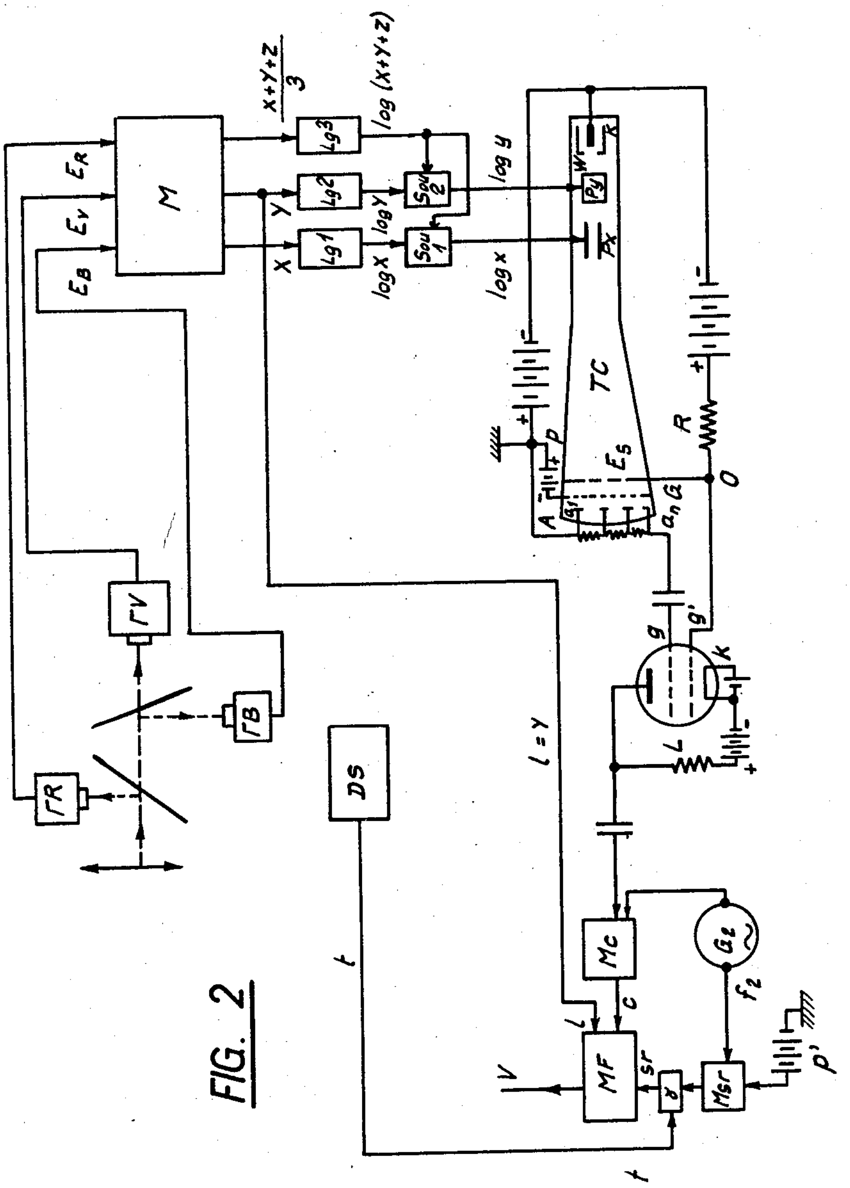
Figure 2 represents an improved encoding device in accordance with the invention.

Figures 2–*b*, 2–*c* and 2–*d* illustrate the arrangement for the transmission through a waves-guide, by means of pulse code modulation and demodulation, of both the luminance signal and the coded color signal.

Figures 4, 5:
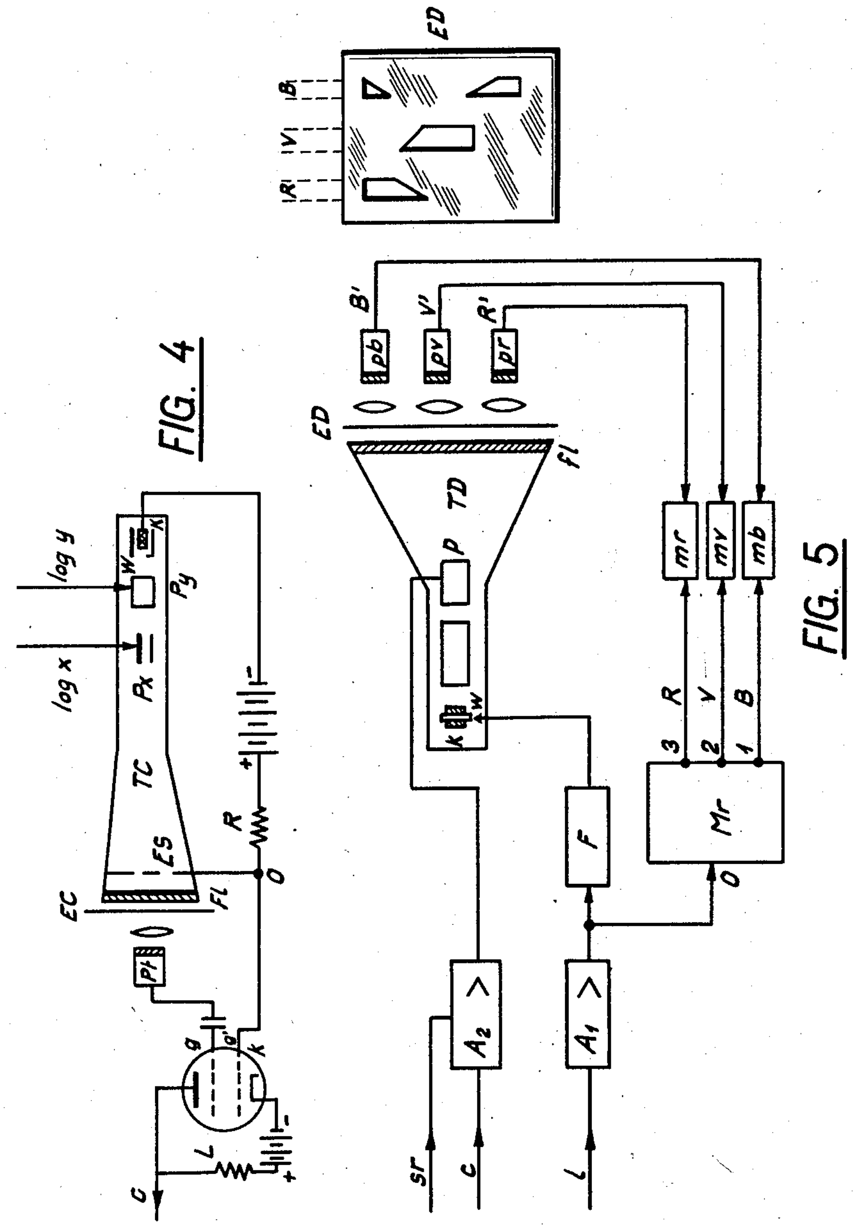

Figure 4 represents a modification of the encoding device for the case of simplified industrial color television, in accordance with the invention.

Figure 5 represents a modification of the decoding device for the case of simplified industrial color television, in accordance with the invention.

Figures 1, 1A:
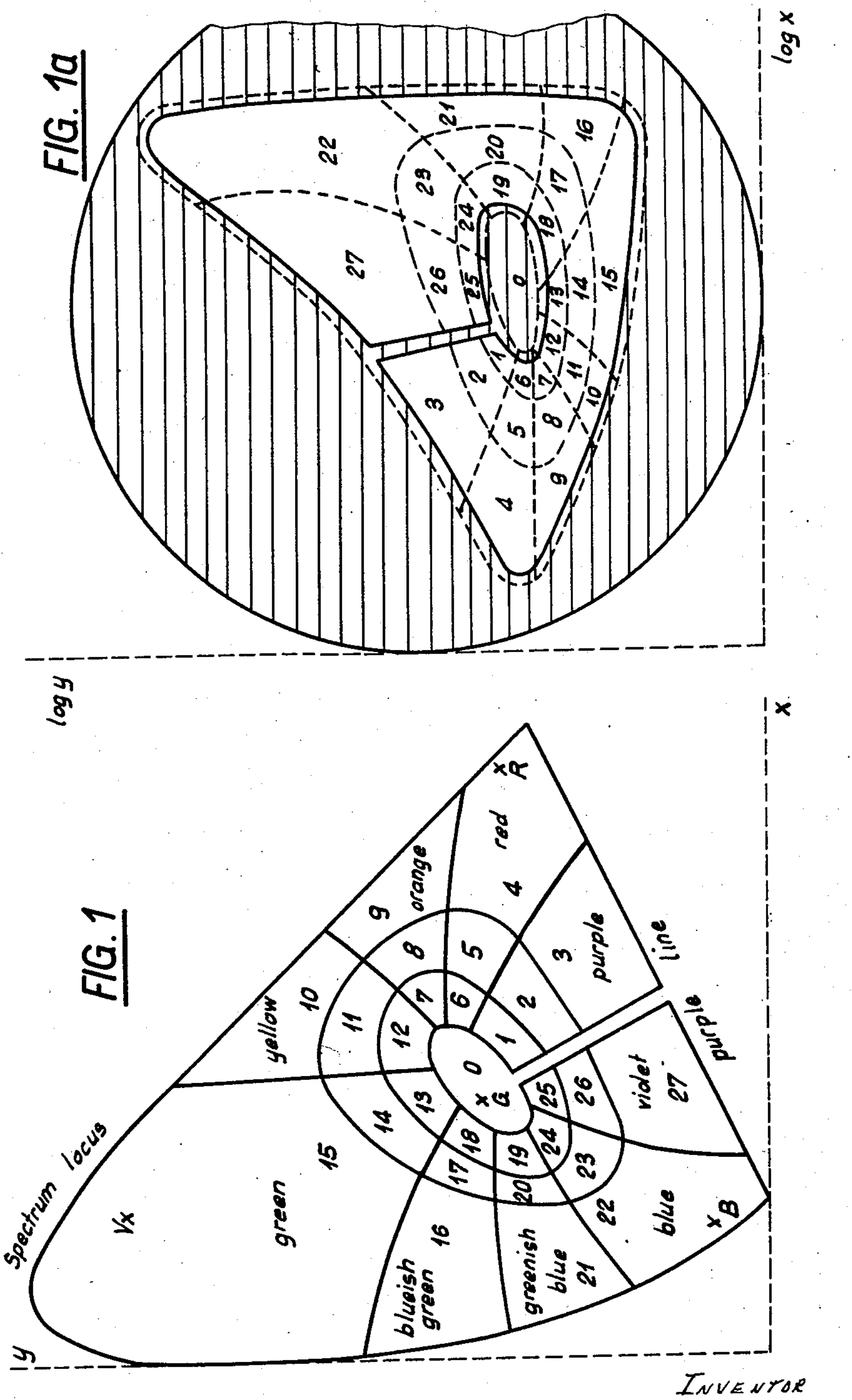
Figures 3, 3A:
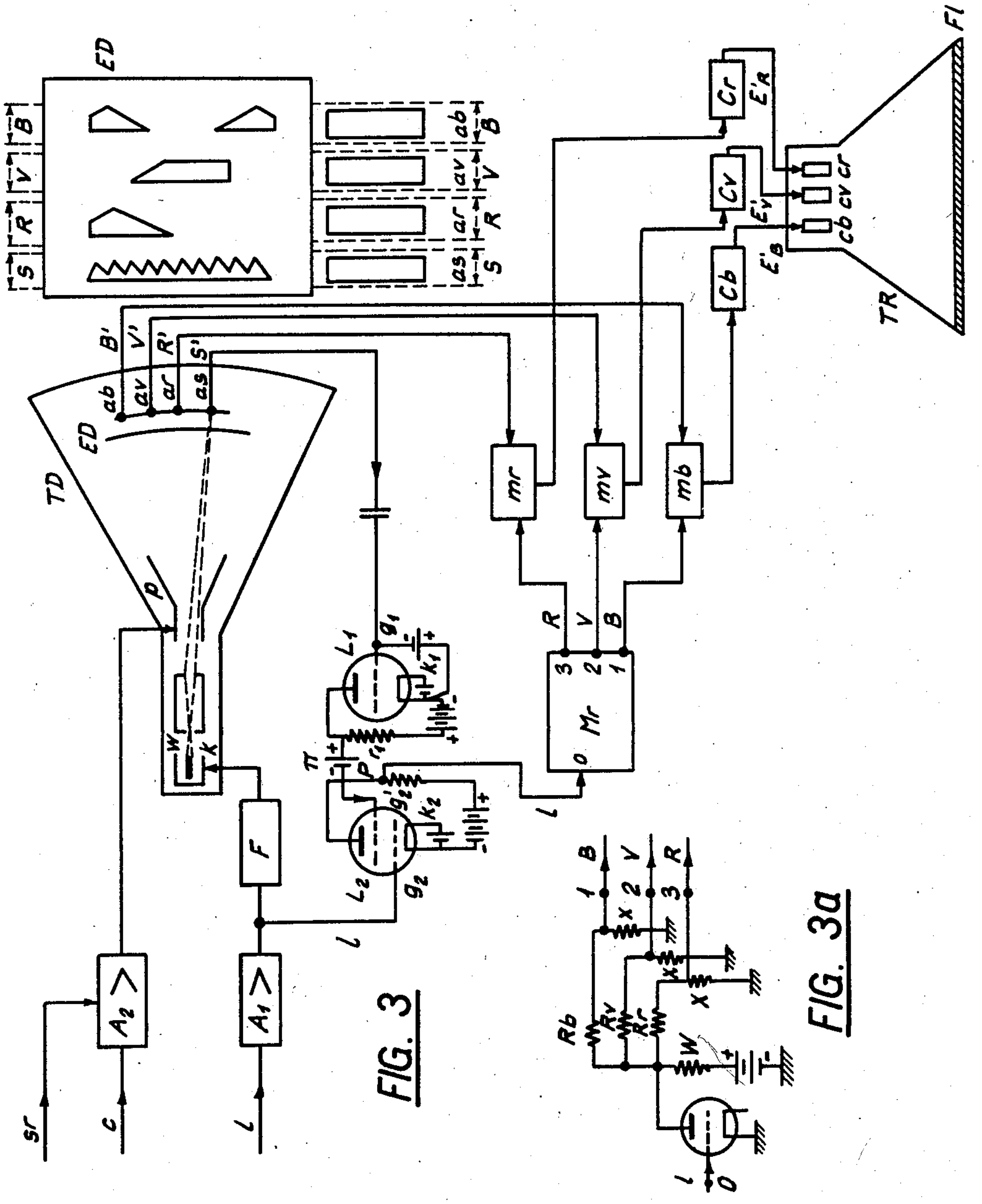
Figure 3 represents an improved decoding device in accordance with the invention.

Figure 1 represents Maxwell's color triangle in orthogonal coordinates *x, y,* in conformity with the XYZ reference system of the International Illumination Committee; the surface between the "spectrum locus" and the "purple line" is divided in 27 sectors. The central part (marked O) corresponds to white (absence of color) and point C (the trichromatic coordinates of which are $x_c=0.310$ and $y_c=0.316$) corresponds to "Illuminant C" of said Committee. Points B, V, R represent three primary colors, which are the colors of fluorescence (blue B, green V and red R) of the substances constituting the trichrome fluorescent screen of the tube TR reproducing the colored pictures at the receiving station (Figure 3). The trichromatic coordinates of these points B, V, R are:

$$x_B=0.140 \quad x_V=0.210 \quad x_R=0.670$$
$$y_B=0.080 \quad y_V=0.710 \quad y_R=0.330$$

The sectors numbered 3, 4, 9, 10, 15, 16, 21, 22 and 27 correspond to very saturated colors; the sectors numbered 1, 6, 7, 12, 13, 18, 19, 24 and 25 correspond to colors of very little saturation, that is to say: rich in white light.

Figure 1–*a* represents the logarithmic transform of the color triangle of Figure 1; the sectors limited by dotted lines on Figure 1–*a* correspond respectively to the sectors having the same numbers on Figure 1. The solid lines on Figure 1–*a* are the contours of the "suppressing electrode" ES in the encoding tube TC (Figure 2); the hatched portion in Figure 1–*a* is the opaque surface of said suppressing electrode ES. It is apparent that electrode ES masks the external (inside and outside) contours of the logarithmic transform of the color triangle, as well as a narrow zone between the sectors having extreme numbers.

Figure 2 represents schematically the hereabove mentioned "improved encoding device" in accordance with the invention. $E_B$, $E_V$, $E_R$ are the primary electric voltages at the output terminals of the (blue ΓB, green ΓV and red ΓR) pick-up cameras; these voltages are applied to eletcronic matrix M obtained in applying the well-known colorimetric transform for the transfer from a system of primaries B, V, R to the XYZ reference system of the International Illumination Committee. For the primaries $E_B$, $E_V$, $E_R$, whose trichromatic coordinates are given above, the equation of matrix M is:

$$\left\| \begin{matrix} X \\ Y \\ \frac{X+Y+Z}{3} \end{matrix} \right\| = \left| \begin{matrix} 0.607 & 0.173 & 0.200 \\ 0.299 & 0.586 & 0.114 \\ 0.302 & 0.275 & 0.477 \end{matrix} \right| \times \left\| \begin{matrix} E_R \\ E_V \\ E_B \end{matrix} \right\|$$

The electric voltages X, Y, $$\frac{X+Y+Z}{3}$$

obtained at the output of matrix M are applied to

"logarithmic formatrons" $Lg1$, $Lg2$, $Lg3$ (which are cathode ray tubes having a flat beam impinging on a mask provided with a slit of exponential form, behind which is located an electrode collecting the electrons passing through said slit); at the output terminals of said "formatrons" are obtained the electric voltages $\log X$, $\log Y$ and $\log (X+Y+Z)$ which are applied to triodes acting as subtracters $Sou1$, $Sou2$. At the output of said triodes are obtained the electric voltages $\log x = \log X - \log (X+Y+Z)$ and $\log y = \log Y - \log (X+Y+Z)$. These electric voltages ($\log x$ and $\log y$) are applied to the deflecting plates of encoding tube TC ($P_x$ for horizontal deflection of the cathode ray beam, and $P_y$ for vertical deflection of said cathode ray beam of tube TC).

Anode A of tube TC is at a high positive potential referred to cathode K, and is constituted by the metallic sectors ($a_1$, $a_2$, . . . $a_n$) of the logarithmic transform of the color triangle (Figure 1–*a*); these metallic sectors are electrically insulated from each other and are provided with output metallic wires connected to appropriate resistances, outside tube TC. The grid G (very thin metallic mesh at an appropriate negative potential referred to anode A by means of battery *p*) prevents the rebound of secondary electrons from the anode sector (on which the cathode rays emitted by K impinge) to the neighbouring sectors; consequently the intensity of the cathode ray beam remains always the same whatever sector of anode A is struck by said beam. The electric voltage (equal to the product of this constant intensity by the resistance between the output wire connected to the struck anode sector and the output wire connected to the reference sector $a_1$ at zero potential) is applied to the control grid *g* of blocking tube L.

The "suppressing electrode ES" of tube TC (having the shape shown hatched on Figure 1–*a*) is raised at a positive potential referred to cathode K through a high resistance R. If the cathode ray beam impinges on said suppressing electrode ES, a great drop of potential occurs along resistance R in such a way that the "blocking grid $g'$" of tube L becomes negative in reference to cathode *k* of tube L, so that the plate current in said tube L decreases very much. If, on the contrary, the cathode ray beam in tube TC [going through the wide opening of suppressing electrode ES (Figure 1–*a*)] impinges on one anode sector ($a_1$ . . . $a_n$), no current flow through resistance R; the end O of said resistance R (and consequently also the blocking grid $g'$ of tube L) becomes positive in reference to cathode *k*; the electric voltage, applied to control grid *g* by the anode sector on which the cathode ray beam has impinged in tube TC, is therefore amplified by tube L, and the plate current of said tube L takes a value corresponding to the number of said struck anode sector of tube TC; this plate current of tube L determines the instantaneous value of the "coded color signal *c*." The "luminance signal $l=Y$" is taken directly at the Y output terminal of matrix M.

The coded color signal *c* modulates (by means of modulator M*c*) the amplitude of a sine wave of frequency $f_2$ generated by oscillator $G_2$; said sine wave is called hereafter "the color subcarrier"; its frequency $f_2$ is an odd multiple of half the scanning lines frequency (for scanning the televised object by the pick-up cameras), so that the spectrum of the color coded signal *c* is interlaced with the spectrum of the luminance signal *l* in accordance with a well-known method.

Figure 2 shows also the central synchronizing device DS which generates the saw-tooth waves for sweeping horizontally and vertically the photosensitive surfaces in the pick-up cameras ΓB, ΓV and ΓR, and which generates also the line synchronizing pulses *t* transmitted to the receiving station. A battery $p'$ modulates at constant amplitude (by means of modulator $M_{sr}$) a sine wave of frequency $f_2$ coming also from oscillator $G_2$; the modulated wave at the output of modulator $M_{sr}$ goes through a gate-tube $\gamma$ under the control of the line synchronizing pulses *t*; said gate-tube allows this constant amplitude modulated sine wave of frequency $f_2$ to be transmitted to the receiving station only during a short period at the beginning of each picture-scanning line; this short wave-train *sr* (Figure 2–*a*) is called hereafter the "amplitude reference signal" because its purpose is to give the scale of the color coded signal *c* at the receiving station. The signals *l* (luminance), *c* (color code) and *sr* (amplitude reference) are mixed together in final mixer MF; at the output of said mixer MF is obtained the "composite video signal V," an oscillogram of which is represented on Figure 2–*a* for a picture scanning line.

Figure 3 represents the color television receiving station in which well-known amplitude-filters and frequency-filters (not shown on Figure 3) separate from each other, in accordance with well known techniques, the luminance signal *l*, the coded color signal *c*, the amplitude reference signal *sr* and the line synchronizing pulses *t*. The coded color signal is amplified by amplifier $A_2$ (the gain of which is automatically regulated under the control of amplitude reference signal *sr*), and then applied to the horizontally deflecting plates *p* acting on the flat cathode ray beam emitted by the rectilinear cathode *k* of the decoding tube TD. The luminance signal *l* goes through amplifier $A_1$, and through frequency filter F. The band of frequencies transmitted by filter F has the same width as the band of frequencies transmitted through amplifier $A_2$, and nearly half the width of the band of frequencies transmitted through amplifier $A_1$. At the output of filter F, only the low frequency part of the luminance signal 1 remains and is applied to the Wehnelt cylinder *w* of decoding tube TD. The electron optics of said tube TD is cylindrical, *k* being the trace (on the horizontal plane of Figure 3) of the rectilinear vertical cathode. ED is the trace of the cylindrical "decoding electrode" which (after being flattened upon the horizontal plane of Figure 3) has the shape shown at the right of said Figure 3; ED embodies four slits (B, V, R, S) behind which are located four cylindrical collecting anodes (*ab, av, ar, as*), also shown at the right of Figure 3 after being flattened upon the horizontal plane. The coded color signal *c*, applied to deflecting plates *p* at a given instant, positions (on the particular generant of cylinder ED corresponding to the value of *c* at said instant) the vertical rectilinear electronic image of cathode *k*, the total number of electrons constituting said image being substantially proportional to the value of luminance signal *l* at said instant, because the greatest part of the energy in the luminance spectrum is in the low frequency region. The widths of the 3 slits B, V, R along this particular generant of cylinder ED have been previously determined in such a way that the bundles of electrons collected by anodes *ab, av, ar* through said slits should be respectively proportional to the luminous flux of the three primary colors (blue B, green V and red R) which must be mixed together in order to reproduce the "hue" of the color corresponding to the value of coded color signal *c* allotted to said particular generant of ED, that is to say the hue of the color of the particular elemental area of the televised object which is scanned at said instant in the corresponding transmitting station. The determination of the widths of slits B, V, R must naturally take into account (when solving such well known color mixture problems) the electrooptical efficiencies of the fluorescent substances building the mosaic of the fluorescent screen *Fl* of viewing tube TR, said substances producing respectively blue, green and red lights when struck by electrons.

To each sector of color triangle of Figure 1 corresponds one value of coded color signal *c*, which carries not only an information of "hue," but also an information of "saturation," that is to say the relative proportion of hue and white in the color corresponding to said sector of said color triangle. The width of the saw-tooth slit S of decoding electrode ED along a particular generant of cylinder ED is precisely proportional to the "saturation" corresponding to the particular value of coded color signal $c$ to which said generant is allotted. The width of slit S is therefore maximum for the generants corresponding to very saturated colors (sectors 3, 4, 9, 10, 15, 16, 21, 22 and 27 on Figure 1) and is minimum for the generants corresponding to colors with very little saturation (sectors 1, 6, 7, 12, 13, 18, 19, 24 and 25 on Figure 1). For purely white or purely black elemental areas of the televised object, when the cathode ray beam of encoding tube TC strikes the suppressing electrode ES (Figure 2), the coded color signal $c$ has such a value that the rectilinear electronic image of cathode $k$ of decoding tube TD (Figure 3) is at the extreme left of decoding electrode ED, on a plain part of said electrode, and consequenty the voltages B', V', R' and S at the output of collecting electrodes $ab$, $av$, $ar$, $as$ are equal to zero.

The entire luminance signal $l$ (at the output of amplifier $A_1$, Figure 3) is applied to the control grid $g_2$ of a two-grid tube $L_2$. The electric voltage S, at the output of anode as of decoding tube TD, is applied to grid $g_1$ of triode $L_1$, the plate of which is connected to blocking electrode $g'_2$ of tube $L_2$. This tube $L_2$ blocks substantially the luminance signal $l$ when grid $g'_2$ is negative in reference to cathode $k_2$ whereas the luminance signal $l$ is, on the contrary, well amplified by tube $L_2$ when grid $g'_2$ is positive in reference to cathode $k_2$. The blocking action of tube $L_2$ takes place when the coded color signal $c$ corresponds to a very saturated color, because then the electric voltage S (at the output of anode as of decoding tube TD) having a maximum value, grid $g_1$ is positive in reference to cathode $k_1$ of triode $L_1$, the plate current of said triode $L_1$ is then large and prodces a great negative voltage drop along resistance $r_1$, said negative voltage drop adds to the negative voltage produced by battery $\pi$, so that grid $g'_2$ becomes very negative in reference to cathode $k_2$ of tube $L_2$.

On the contrary, when the coded color signal $c$ corresponds to a color with very little saturation, electric voltage S (at the output of anode as of decoding tube TD) is very small, grid $g_1$ is negative in reference to cathode $k_1$; the voltage drop along resistance $r_1$ is small. In spite of the battery $\pi$, the positive pole of the plate battery of triode $L_1$ makes grid $g'_2$ positive in reference to cathode $k_2$, so that tube $L_2$ amplifies well the luminance signal 1 applied to grid $g_2$.

The luminance signal $l$ is transferred from point P of the plate circuit of tube $L_2$ to the input terminal 0 of a matrix $M_r$ which gives, at its output terminals 1, 2, 3, the three primary components (blue B, green V and red R) of said luminance signal $l=Y$, in the relative proportions corresponding to white light. The mixers $mb$, $mv$, $mr$ receive, on one side, the primary components B, V, R of the luminance, weighted (by the action of triode $L_1$ and tube $L_2$) in conformity with the "saturation" S, and, on the other side, the components B', V', R' of the "hue." In the case of a very saturated color, the components B', V', R' of the hue must be prominant and this is secured by the blocking action of $L_2$, which, then, reduces very much the components B, V, R of the white light (luminance); in the case of a color with very little saturation, this blocking action does not occur, tube $L_2$ amplifies very much the white light (luminance) and the componnets B, V, R are prominant. For a purely white or purely black area of the televised object, $B'=V'=R'=S=0$; only the components B, V, R of the luminance go through the mixers $mb$, $mv$, $mr$.

Figure 3–$a$ represents schematically the matrix $M_r$ of Figure 3. The luminosity factors of the 3 primaries represented by points B, V, R on the color triangle of Figure 1 are such that the luminance is given by the following equation:

$$l=Y=0.30\ R+0.59\ V+0.11\ B$$

In order to obtain the desired components B, V, R of white light at the output terminals (1, 2, 3) of matrix $M_r$ when the luminance signal $l$ is applied at the input terminal 0 of said matrix, the resistances $R_b$, $R_v$ $R_r$, X and W constituting said matrix $M_r$ must satisfy the following equations:

$$R_r+X=\frac{1}{3}\frac{W}{0{,}30}$$

$$R_v+X=\frac{1}{3}\frac{W}{0{,}59}$$

$$R_b+X=\frac{1}{3}\frac{W}{0{,}11}$$

These equations determine completely matrix $M_r$ when the triode at th einput of said matrix is known (and consequently W is known) and when th eimpedance X, matching the impedances of the lines connecting matrix $M_r$ to mixers $mb$, $mv$, $mr$, is also known.

The mixtures $(B+B')$, $(V+V')$, $(R+R')$ at the outputs of mixers $mb$, $mv$, $mr$ respectively (Figure 3) are applied to electron guns $cb$, $cv$, $cr$ of viewing tube TR (reproducing the colored pictures on its trichrome fluorescent screen $Fl$), through "gamma correctors" C$b$, C$v$, C$r$. These gamma correctors (well known in the television technique) are amplifiers embodying electric networks with diversely polarized cristal diodes; by appropriate adjustments of these diverse polarizations, the non-linearities (or "gammas") of the pick-up cameras ΓB, ΓV, ΓR (Figure 2) and the non-linearities of the fluorescent substances of the fluorescent screen $Fl$ of viewing tube TR (Figure 3) are compensated.

In the case of industrial color television (also called "closed circuit color television"), it is sometimes possible to consider only the hue of the color, and to ignore the variations of the saturation from one elemental area to another in the televised object. In such a case, the color triangle (Figure 1) would be divided only in 9 sectors by the solid lines joining the center to a few points of the spectrum locus or of the purple line, these 9 sectors corresponding to purple, red, orange, yellow, green, bluish green, greenish blue, blue and violet. Figure 4 represents a modification of the encoding device of Figure 2 for this particular case of simplified industrial color television. The encoding tube TC, instead of an anode A (constituted by the various metallic sectors of the logarithmic transform of Figure 1) and instead of grid G, embodies a fluorescent screen $Fl$, in front of which is located (outside tube TC) an "encoding screen" EC made of nine sectors of the logarithmic transform of color triangle of Figure 1, these sectors having optical transparencies proportional to the successive numbers of said nine sectors, the central part (O) and the small zone between extreme sectors No. 1 and 9 being entirely opaque and sectors 1 to 9 having increasing transparencies from dark gray to white; beyond said encoding screen EC is located a phototube P$t$ (photoelectric cell with electron multiplier), the output terminal of which is connected to the control grid $g$ of the blocking tube L. The suppressing electrode ES of the encoding tube TC has the shape of the hatched part of Figure 1–$a$, and is connected to the blocking grid $g'$ of tube L, which operates as explained hereabove for Figure 2.

Figure 5 represents a modification of the decoding device of Figure 3 for this particular case of simplified industrial color television. The decoding tube TD, instead of a mask ED with four slits and instead of the four collecting electrodes ($ab$, $av$, $ar$, $as$) shown on Figure 3, has a fluorescent screen $fl$, in front of which is located (outside tube TD) a decoding screen ED (Figure 5) entirely opaque except on three fully transparent channels R, V, B; said decoding screen ED is represented at the right of Figure 5 after being flattened upon the horizontal plane of Figure 5, the hatched portion being completely opaque. Beyond these three transparent channels R, V, B are located three phototubes *pb, pv, pr*. For a given value of the coded color signal *c* (corresponding to a particular hue and applied to the deflecting plates *p* of decoding tube TD), the luminous vertical image of the rectilinear cathode *k* of said tube is located in front of a particular vertical line of encoding screen ED, at a place where the widths of the channels R, V, B correspond respectively to the luminous flux (red, green, and blue) which must be mixed together in order to reproduce the particular hue considered; the electric voltages B′, V′, R′ (primary components of said hue) are mixed (in the mixers *mr, mv, mb*) with the primary components B, V, R of the luminance signal *l* (white light), obtained at the output of matrix $M_r$, as explained hereabove for Figure 3.

Figures 2–*b* and 2–*c* illustrate the arrangement (in accordance with the invention) for the transmission (between the transmitting and receiving color television stations connected together by a waves-guide) of both the luminance signal *l* and the coded color signal *c*, with the minimum number of coded pulses (the pulse code modulation being applied to such a transmission).

Figure 2–*a* shows the oscillogram (for one scanning line of the transmitted color picture) of the composite video-signal V constituted by the interlace of the spectra of said luminance signal *l* (dotted line) and said chrominance signal *c* (solid line). The composite video signal V (obtained at the output of the final mixer MF in the transmitting station, Figure 2) is applied at the origin O of the arrangement for coded pulses transmission (Figure 2–*b*).

As the chrominance and the luminance are together conveyed, from one end to the other of the waves-guide, by pulses quantizing the successive amplitudes of the composite video signal V (Figure 2–*a*), it is enough to sample (at twice the frequency of the color subcarrier and in phase with said subcarrier) the maxima 1, 3, 5, 7, 9, 11, etc. . . . and the minima 2, 4, 6, 8, 10, 12, etc. . . . of said composite video signal V, in conformity with the well-known Shannon theorem; the phase of the modulated color subcarrier has not to be considered and this is a great advantage for the use of waves-guide in which unavoidable conversions and reconversions of the electromagnetic vibration mode of the medium inside the waves-guide are due to the unavoidable little irregularities of said waves-guide.

This advantage of the invention is better understood by means of a comparison with other color television systems, in which it is necessary to transmit (from one end to the other of the waves-guide) not only the amplitude, but also the phase of the composite video signal V (Figure 2–*a*); it would then be necessary to sample, for each period, not only the maximum and the minimum, but also 2 intermediate points (crossings with the dotted line of Figure 2–*a*, for example), in order to reproduce the phase with the required accuracy at the receiving station. The total number of color television channels provided by a given waves-guide would then be reduced in the proportion of 50% (as compared with the invention), because twice the number of pulses would be required for each channel.

Figure 2–*b* shows the oscillator $G_2$ of Figure 2 generating the color subcarrier at frequency $f_2$. Rectifier R rectifies the two half-waves of said subcarrier in order to produce a sine wave at frequency $2f_2$, applied to shaping filters F, F′ which produce respectively the control pulses IC and IC′ of the appropriate forms shown on Figure 2–*b*. The pulses IC are applied to the sampler E*ch*1 which has the classical constitution shown on Figure 2–*d*; it embodies a pulse transformer T and 2 triodes $L_1$ $L_2$, the "plate-cathode spaces" of which are connected in parallel, but are conducting in opposite directions; the grids of said triodes are polarized below "cut-off" during the opening of the sampler, whereas these grids become very positive under the action of a pulse IC at the moment where a low resistance path must be established between the input O and the output M of sampler E*ch*1 (Figure 2–*b*). The sloping bar at the top of each pulse IC is a predistortion such that, after going through transformer T, perfectly rectangular pulses are applied to triodes $L_1$ and $L_2$ (Figure 2–*d*). The pulses IC′ control a gate tube associated with amplifier $A_V$ connected at the output terminal M of sampler E*ch*1. The output current of amplifier $A_V$ produces (by means of plates $P_V$) the vertical deflection of the cathode ray beam of tube TG, which generates the coded pulses. Said tube TG embodies also an electron gun C, two plates P*h* which deflect horizontally said cathode ray beam under the action of a saw-tooth wave applied to amplifier A*h*, a secondary electrons collector K, the quantizing electrode $E_q$, the coding electrode $E_c$, and the plate P which collects the coded pulses IC″, in accordance with the well known F. B. Llewellyn method.

These coded pulses IC″, corresponding successively to the successive maxima and minima of the composite video signal V (Figure 2–*a*), are applied to the origin $N_1$ of the waves-guide, as well as the synchronizing pulses *t* (Figure 2) which secure the synchronism between the transmitting and the receiving color television stations at both ends of said waves-guide.

Figures 2A, 2B, 2C, 2D:
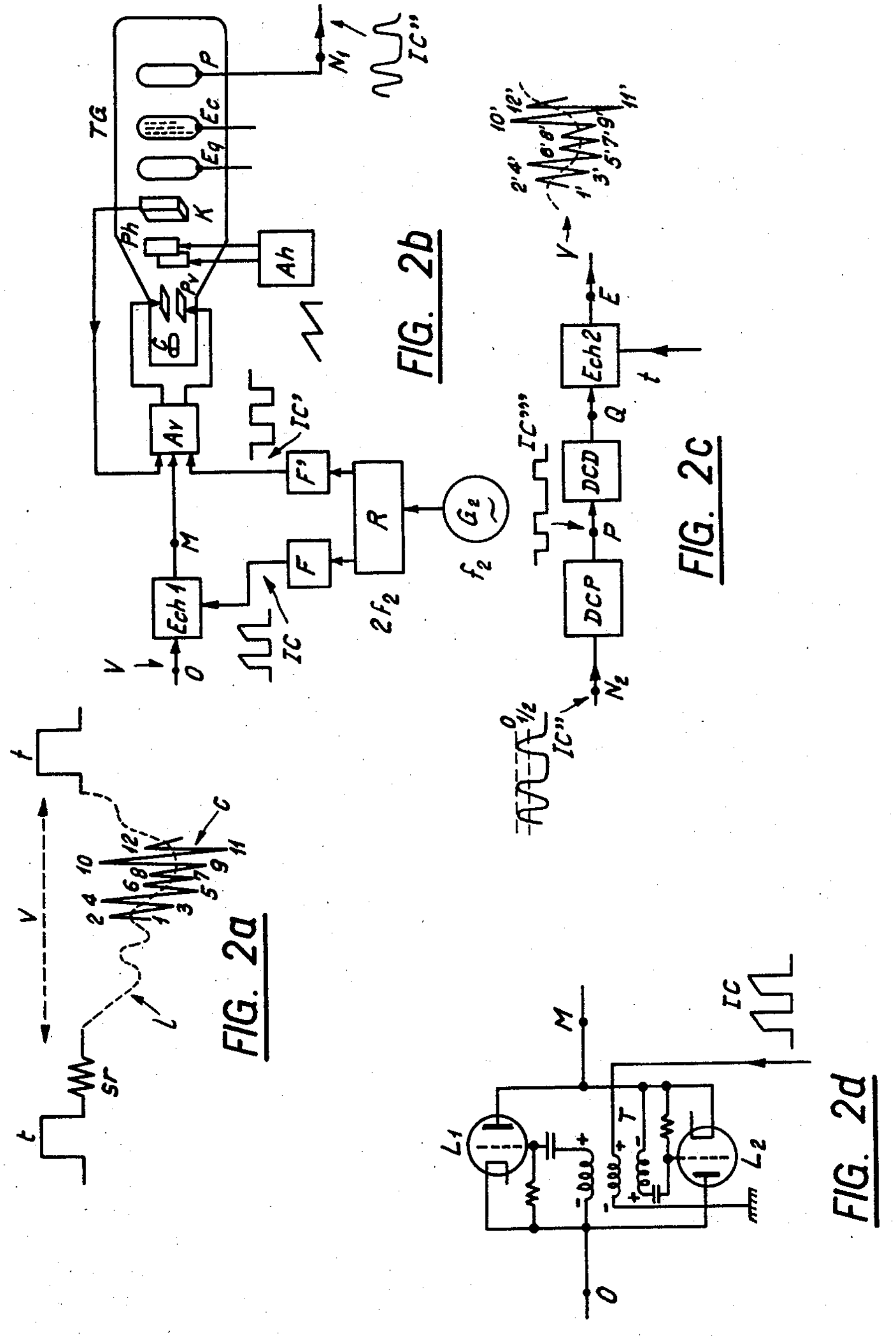

In the receiving station (Figure 2–*c*), at the end $N_2$ of the waves-guide, the coded pulses IC″ are applied at the input terminal of a classical "slicer" DCP, which "slices" the pulses IC″ at level 1/2 in order to produce the pulses IC‴ of half height, but of perfectly rectangular shape; these pulses IC‴ are applied to the input of a classical Shannon decoder DCD, embodying a "resistance R-capacitor C circuit," which receives (from a constant current regulator) identical electric charges under the action of each coded pulse IC‴. At the output terminals Q of said capacitor C (of said resistance-capacitor circuit) is then obtained an electric voltage having successive amplitudes equal to the successive maxima and minima of the composite video-signal V (Figure 2–*a*). An amplifier-sampler E*ch*2 (timed by the synchronizing pulses *t* proceeding from the transmitting station) takes these successive amplitudes of said electric voltage appearing at Q, so that the composite video-signal V is restituted at point E (Figure 2–*c*) as it was, when applied at point O (Figure 2–*b*) in the transmitting station. Beyond point E, at the receiving station, amplitude-filters and frequency-filters separate (in accordance with the classical television technique) from each other, the amplitude-reference signal *sr* (Figure 2*a*), the luminance signal *l* and the coded color signal *c*; these three signals, so separated, are then treated as explained in relation with Figure 2 hereabove.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Color television system of the type in which a luminance signal for each point of the televised object and a chrominance signal for each elemental area of said object are transmitted between the corresponding stations, said chrominance signal corresponding to the number of the sector representing the color of said elemental area in the color triangle, embodying: at the transmitting station: 3 cameras producing, for each point of the elevised object, 3 primary signals corresponding to 3 components of the luminous flux emitted by said point of said object, a matrix of resistors transforming said 3 primary signals into secondary signals respectively proportional to the components X and Y and to the sum X+Y+Z of the 3 components of said luminous flux in the XYZ Colorimetric Reference System of the International Illumination Committee, said secondary signal proportional to component Y being precisely the luminance signal characterizing the brightness of said point; three logarithmic formations associated with two electronic adders for deriving, from said secondary signals, two tertiary signals proportional to the logarithms of the trichromatic coordinates *x, y* of the sector of color triangle corresponding to said elemental area comprising said point of said televised object; an encoding cathode ray tube comprising a cathode, an anode made of metallic sectors corresponding, in logarithmic transform, to the sectors of the color triangle, electrically insulated from each other and respectively connected to different points of a resistor, a grid located close to said anode and at a negative potential related to said anode for preventing any rebound of secondary electrons from one anode sector to the neighboring anode sectors, a suppressing electrode masking the external contours of said anode as well as a narrow zone between sectors of extreme numbers and associated with a blocking tetrode having its grids connected to said resistor and to said suppressing electrode for preventing the cathode ray beam from impinging on said external contours or on said narrow zone, and deflecting means energized by said tertiary signals proportional to said trichromatic coordinates for positioning the electronic image of said cathode on the particular anode sector corresponding to the color of said elemental area, whereby the chrominance signal characterizing both the hue and the saturation of said color of said elemental area is obtained at the output of said tetrode; means for interlacing the spectra of said luminance signal and said chrominance signal for obtaining a composite video signal; means for generating an amplitude reference signal at the beginning of each scanning line; and means for shaping said composite video-signal and said amplitude reference signal in view of their transmission to the distant receiving station; and at the receiving station: means for separating from each other the luminance signal, the chrominance signal and the amplitude reference signal; an amplifier energized by said chrominance signal and the gain of which is automatically regulated by said amplitude reference signal; a filter for extracting the low frequency components of said luminance signal a decoding cathode ray tube comprising a vertical rectilinear cathode emitting a flat beam of electrons; a Wehnelt cylinder for controlling the intensity of said beam, said cylinder being energized by said low frequency components of said luminance signal, deflecting electrodes for horizontally deflecting said beam, said electrodes being energized by said regulated chrominance signal, a cylindrical decoding electrode having 4 horizontal slits B, V, R, S, the electronic image of said cathode being positioned on a particular generant of said decoding electrode by said deflecting electrodes, the widths of slits B, V, R, along said particular generant corresponding to the luminous fluxes of 3 primary colors to be mixed together for reproducing the hue related to the particular chrominance signal applied to said deflecting electrodes and the width of slit S along said particular generant corresponding to the degree of saturation related to said particular chrominance signal, and four collecting electrodes *ab, av, ar,* as located respectively behind slits B, V, R, S in order to generate 3 signals B′, V′, R′ corresponding to said fluxes of 3 primary colors and an auxiliary signal S corresponding to said degree of saturation; a matrix for dividing said luminance signal in 3 parts B, V, R proportional to the components of white light having said 3 primary colors; a blocking tube associated with a triode for regulating the ratio of white light to colored light in accordance with said degree of saturation, said blocking tube being energized by said received luminance signal and said triode acting on the blocking grid of said blocking tube under the control of said auxiliary signal S; and mixing means for mixing said signals B′, V′, R′ obtained on said collecting electrodes *ab, av, ar* with said signals B, V, R obtained at the output of said matrix, the mixtures so obtained being applied through appropriate gamma correctors to the control electrodes of the three electron guns of a viewing tube provided with a trichrome fluorescent screen made of a mosaic of luminescent materials producing said 3 primary colors.

2. Color television system for simplified industrial television of the type in which a luminance signal for each point of the televised object and a chrominance signal for each elemental area of said object are transmitted between the corresponding stations, said chrominance signal corresponding to the number of the sector representing the hue of the color of said elemental area in the color triangle, embodying at the transmitting station: 3 cameras producing, for each point of the televised object, 3 primary signals corresponding to 3 components of the luminous flux emitted by said point of said object, a matrix of resistors transforming said 3 primary signals into secondary signals respectively proportional to the components X and Y and to the sum $X+Y+Z$ of the 3 components of said luminous flux in the XYZ Colorimetric Reference System of the International Illumination Committee, said secondary signal proportional to component Y being precisely the luminance signal characterizing the brightness of said point; three logarithmic formations associated with two electronic adders for deriving, from said secondary signals, two tertiary signals proportional to the logarithms of the trichromatic coordinates *x, y* of the sector of color triangle corresponding to the hue of the color of said elemental area comprising said point of said televised object; an encoding cathode ray tube comprising a cathode, a fluorescent screen, deflecting means energized by said tertiary signals proportional to said trichromatic coordinates, and a suppressing electrode; an encoding screen outside said tube and close to said fluorescent screen, said encoding screen being provided with sectors of different optical transparencies and corresponding, in logarithmic transform, to the sectors related to different hues in the color triangle; a lens collecting the luminous rays emitted by said fluorescent screen through said transparent encoding screen; a phototube comprising an electron multiplier; a blocking tetrode having its grids connected to the output terminals of said phototube and to said suppressing electrode of said encoding cathode ray tube, whereby the chrominance signal characterizing the hue of the color of said elemental area of the televised object is obtained at the output of said tetrode when said deflecting means energized by said tertiary signals position the electronic image of said cathode on said fluorescent screen in front of the desired sector of said transparent encoding screen; means for interlacing the spectra of said luminance signal and of said chrominance signal for obtaining a composite video-signal; means for generating an amplitude reference signal at the beginning of each scanning line; and means for shaping said composite video-signal and said amplitude reference signal in view of their transmission to the distant receiving station; and at the receiving station: means for separating from each other the luminance signal, the chrominance signal and the amplitude reference signal; an amplifier energized by said chrominance signal and the gain of which is automatically regulated by said amplitude reference signal; a filter for extracting the low frequency components of said luminance signal, a decoding cathode ray tube comprising a vertical rectilinear cathode emitting a flat beam, a Wehnelt cylinder for controlling the intensity of said beam, said cylinder being energized by said low frequency components of said luminance signal, deflecting means for horizontally deflecting said beam under the control of said regulated chrominance signal, and a fluorescent screen; a decoding transparent screen located close to said fluorescent screen and having three fully transparent channels B, V, R, the rest of its surface being fully opaque; three cylindrical lenses located behind said transparent channels and three phototubes with electron multipliers located at the focus of said lenses respectively, whereby three primary color signals B′, V′, R′ are produced at the output terminals of said phototubes by the luminous beams emitted by said fluorescent screen and passing through said transparent channels when the luminous image of said rectilinear cathode is positioned on a particular generant of said transparent decoding screen by said deflecting means energized by the instantaneous value of said chrominance signal, the widths of said transparent channels along said particular generant being such that said primary signals B′, V′, R′ are proportional to the luminous fluxes of three primary colors to be mixed together for reproducing the hue corresponding to said instantaneous value of said chrominance signal; a matrix for dividing said luminance signal in three parts B, V, R proportional to the components of white light having said three primary colors; and mixing means for mixing said primary signals B′, V′, R′ obtained at the output of said phototubes with signals B, V, R obtained at the output of said matrix, the mixtures so obtained being applied through appropriate gamma correctors to the control electrodes of the three elecron guns of a viewing color tube provided with a trichrome fluorescent screen.

3. In a color television system in accordance with claim 1, means for shaping the composite video-signals and the amplitude reference signal of each scanning line to transmit said signals with the minimum number of coded pulses through a wave-guide connecting the transmitting station and the receiving station, embodying at the origin of said wave-guide: a rectifying and shaping device fed by the oscillator generating the color subcarrier wave for producing control pulses at a frequency double of the frequency of said color subcarrier and in phase with the maxima and minima of said amplitude reference signal and the maxima and minima of said composite video-signals; a sampler controlled by said control pulses for sampling only said maxima and minima; an amplifier for amplifying said sampled amplitudes and a gate tube controlled by said control pulses; and a pulse code modulating device for quantizing said sampled amplitudes and producing corresponding coded pulses to be transmitted through said wave-guide; and at the end of said wave-guide: a slicer for shaping the received coded pulses into perfectly rectangular pulses; and a decoding device for reproducing, with said rectangular pulses, by pulse code demodulation, said composite video-signals and said amplitude reference signal of each scanning line.

4. In a color television system in accordance with claim 2, means for shaping the composite video-signals and the amplitude reference signal of each scanning line to transmit said signals with the minimum number of coded pulses through a wave-guide connecting the transmitting station and the receiving station, embodying at the origin of said wave guide: a rectifying and shaping device fed by the oscillator generating the color subcarrier wave for producing control pulses at a frequency double of the frequency of said color subcarrier and in phase with the maxima and minima of said amplitude reference signal and the maxima and minima of said composite video-signals; a sampler controlled by said control pulses for sampling only said maxima and minima; an amplifier for amplifying said sampled amplitudes and a gate tube controlled by said control pulses; and a pulse code modulating device for quantizing said sampled amplitudes and producing corresponding coded pulses to be transmitted through said wave-guide; and at the end of said wave-guide: a slicer for shaping the received coded pulses into perfectly rectangular pulses; and a decoding device for reproducing, with said rectangular pulses, by pulse code demodulation, said composite video-signals and said amplitude reference signal of each scanning line.

References Cited in the file of this patent

UNITED STATES PATENTS

| | | |
|---|---|---|
| 2,375,966 | **Valensi** | May 15, 1945 |
| 2,493,926 | **Valensi** | Dec. 27, 1949 |